(12) United States Patent
Vaesen et al.

(10) Patent No.: US 11,177,581 B2
(45) Date of Patent: Nov. 16, 2021

(54) MULTI-CHIP SYSTEM FOR AN ANTENNA ARRAY

(71) Applicant: IMEC VZW, Leuven (BE)

(72) Inventors: Kristof Vaesen, Mortsel (BE);
Siddhartha Sinha, Kessel-Lo (BE);
Akshay Visweswaran, Heverlee (BE)

(73) Assignee: IMEC VZW, Leuven (BE)

( * ) Notice: Subject to any disclaimer, the term of this patent is extended or adjusted under 35 U.S.C. 154(b) by 0 days.

(21) Appl. No.: 16/790,973

(22) Filed: Feb. 14, 2020

(65) Prior Publication Data

US 2020/0266550 A1 Aug. 20, 2020

(30) Foreign Application Priority Data

Feb. 15, 2019 (EP) .................................... 19157579

(51) Int. Cl.
| | |
|---|---|
| *H01Q 21/06* | (2006.01) |
| *H04B 7/0413* | (2017.01) |
| *H04B 7/06* | (2006.01) |
| *H01Q 21/28* | (2006.01) |
| *H01Q 1/22* | (2006.01) |

(52) U.S. Cl.
CPC ......... *H01Q 21/061* (2013.01); *H01Q 1/2283* (2013.01); *H01Q 21/28* (2013.01); *H04B 7/0413* (2013.01); *H04B 7/0617* (2013.01)

(58) Field of Classification Search
CPC .. H01Q 21/061; H01Q 21/28; H04B 47/0413; H04B 47/0617
See application file for complete search history.

(56) References Cited

U.S. PATENT DOCUMENTS

| | | | | |
|---|---|---|---|---|
| 9,331,632 | B2* | 5/2016 | Lee | H03D 7/12 |
| 2014/0073337 | A1* | 3/2014 | Hong | H04W 16/28 |
| | | | | 455/452.1 |
| 2015/0285907 | A1* | 10/2015 | Mohamadi | H01Q 3/24 |
| | | | | 342/21 |
| 2016/0142922 | A1* | 5/2016 | Chen | H04B 7/0851 |
| | | | | 375/267 |
| 2016/0146931 | A1* | 5/2016 | Rao | H01Q 1/3233 |
| | | | | 342/59 |
| 2017/0085005 | A1* | 3/2017 | Aue | H03F 3/24 |
| 2017/0318589 | A1* | 11/2017 | Negus | H04L 5/0007 |
| 2018/0088224 | A1 | 3/2018 | Kishigami | |
| 2018/0269576 | A1* | 9/2018 | Scarborough | H01Q 1/288 |
| 2019/0028153 | A1* | 1/2019 | Suyama | H04B 7/0617 |
| 2019/0081596 | A1* | 3/2019 | Dunworth | H03F 3/211 |
| 2019/0178983 | A1* | 6/2019 | Lin | G01S 7/032 |
| 2019/0235050 | A1* | 8/2019 | Maligeorgos | H03F 3/45179 |

OTHER PUBLICATIONS

Search Report, European Patent Application No. 19157579.4, dated Aug. 1, 2019, 9 pages.

\* cited by examiner

*Primary Examiner* — Jason Crawford
(74) *Attorney, Agent, or Firm* — McDonnell Boehnen Hulbert & Berghoff LLP

(57) ABSTRACT

A multi-chip system is configured as an antenna array. The multi-chip system includes at least two transmitting sets distributed over one or more transmitting chips, where the transmitting sets each include an integrated transmitting antenna and an integrated up-conversion circuit. The multi-chip system further includes at least two receiving chips, where the receiving chips each include at least one integrated receiving antenna and at least one integrated down-conversion circuit.

20 Claims, 14 Drawing Sheets

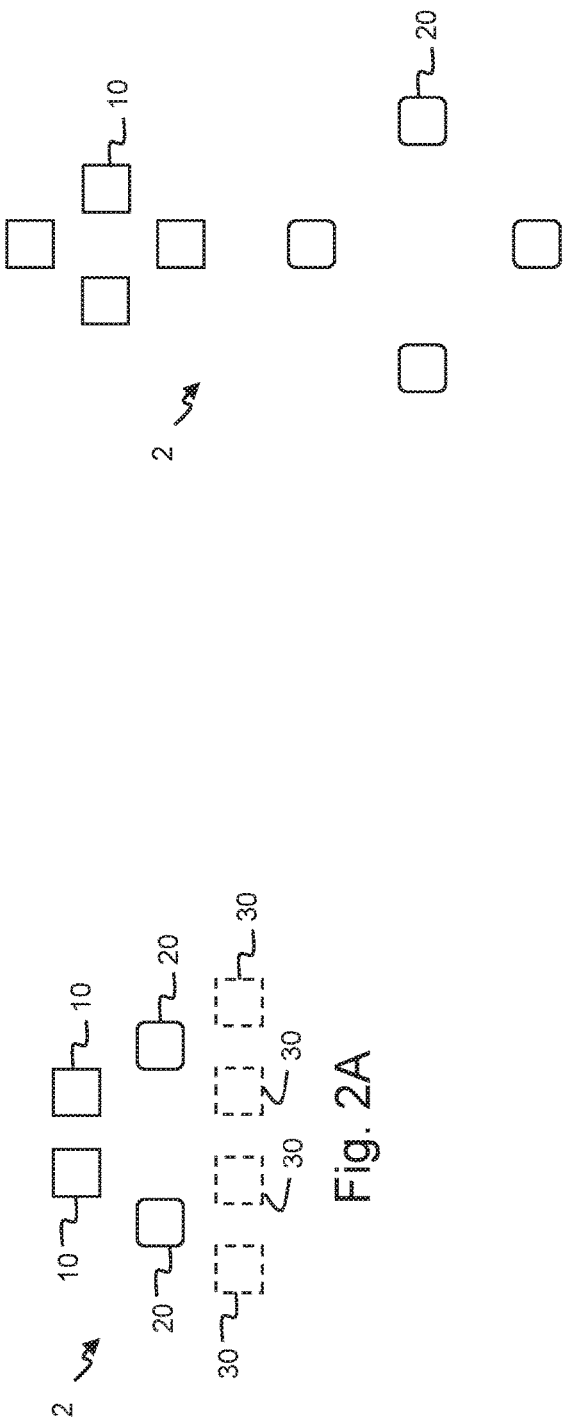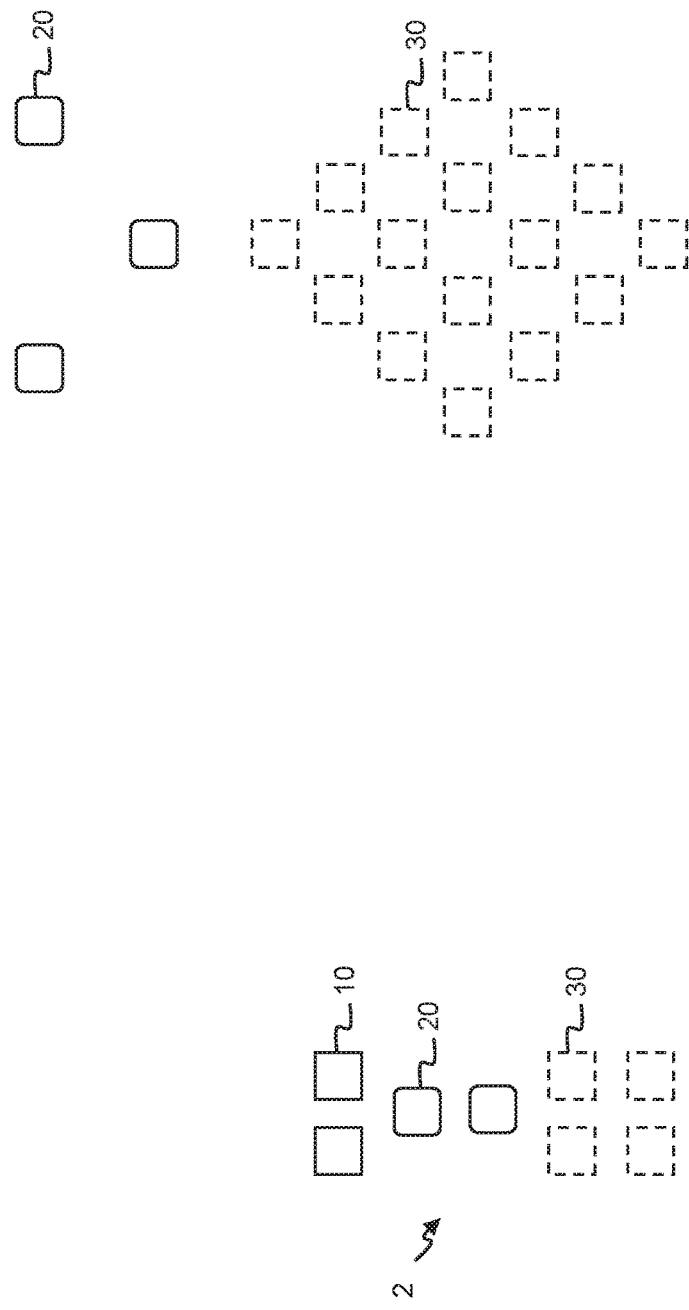

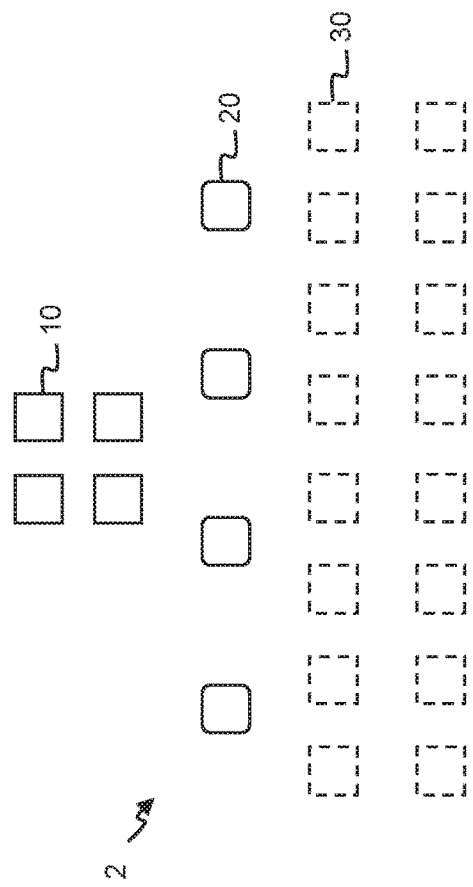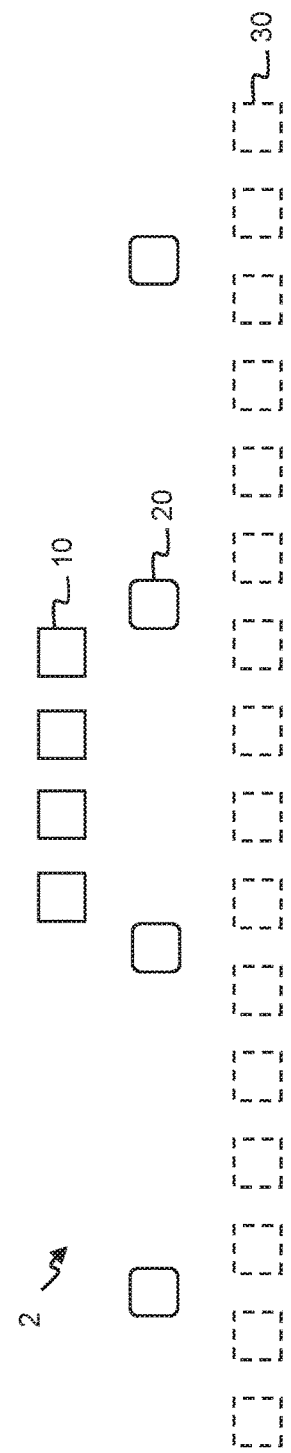

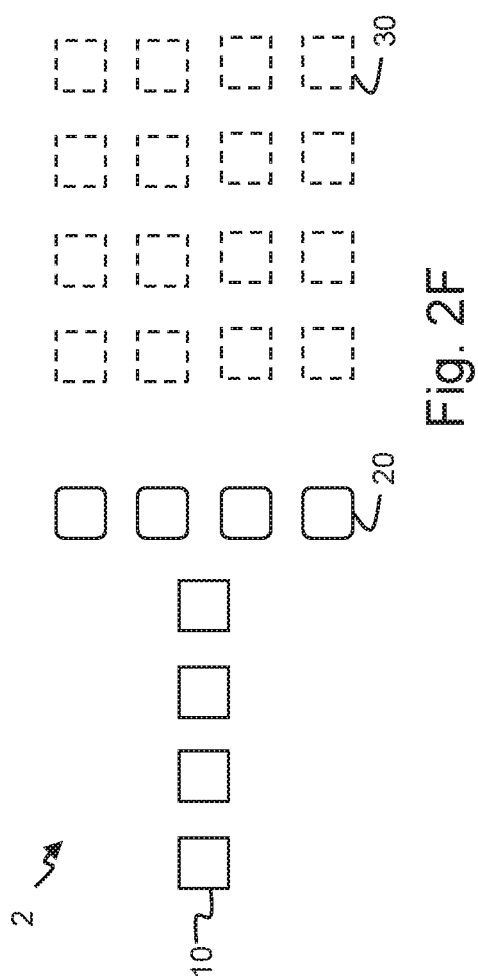

MULTI-CHIP SYSTEM FOR AN ANTENNA ARRAY

CROSS-REFERENCE TO RELATED APPLICATION

The present application is a non-provisional patent application claiming priority to European Patent Application No. 19157579.4 filed Feb. 15, 2019, the contents of which are hereby incorporated by reference.

TECHNICAL FIELD

The present disclosure generally relates to radar and telecommunication systems requiring an array of antennas for, for example, antenna beam-steering or multiple-input-multiple-output operation.

BACKGROUND

Radar and telecommunication systems that allow for, for example, beam steering or Multiple-input-multiple-output radar, also referred to as MIMO radar, require an array of antennas.

MIMO radar is an advanced type of phased array radar employing digital receivers and waveform generators distributed across the aperture. MIMO radar systems can comprise one or more transceiver chips on which multiple transmitters and multiple receiver front-ends are integrated. These chips are mounted on a high-quality substrate. Each transmitting antenna of the MIMO radar radiates an arbitrary waveform independently of the other transmitting antennas. Each receiving antenna can receive these signals. Due to the different waveforms, the echo signals received by the receiving antennas can be re-assigned to the single transmitter. This gives an enlarged virtual receive aperture. MIMO radar systems can for example be used to improve the spatial resolution, and these systems demonstrate a substantially improved immunity to interference.

Traditionally, the transceivers are integrated circuits which are mounted on or connected to an antenna substrate. This is mainly due to the difference in dimensions of the antennas compared to the dimensions of the transceiver chips. Indeed, antennas can be much larger than the active elements such as the transceivers, making it uneconomical to integrate the antennas together with the transceivers on a chip. This size difference becomes even larger when moving from single antennas to antenna arrays.

Recently, there has been a shift towards mmWave frequencies in radar and telecommunication systems. mmWave sensors transmit signals with a wavelength which is in the millimeter range. The size of system components such as an antenna required to process mmWave signals is small. Due to the technology's use of small wavelengths, mmWave technology can provide sub-mm range accuracy and is able to penetrate certain materials. This is extremely valuable for example for sensing technology, for detection of objects and for providing the range, velocity and angle of these objects.

This recent move towards mmWave frequencies makes it feasible in radar and telecommunication systems to integrate single antennas on a chip together with transceivers. This saves in interconnect losses and the need for specific interconnect techniques and mmWave substrates for the integration of the antennas.

Virtual MIMO antenna arrays however are still of another order of magnitude in size. Indeed, the distance between the antennas becomes so large that it becomes very challenging to integrate them on the same chip. The associated cost for this integration further makes it uneconomical. For example, as visible on FIG. 1, a virtual antenna array comprising $N_T$ antennas at the transmitter side with a spacing of $\lambda/2$ between adjacent transmitting elements, where $\lambda$ is the wavelength in free space. The virtual antenna array on FIG. 1 further comprising $N_R$ antennas at the receiver side, wherein the distance between every antenna at the receiver side is $$\frac{N_T \lambda}{2},$$

wherein $\lambda$ is the wavelength in free space, and wherein the spacing between two outer antennas at the receiver side is $$\frac{(N_R - 1) N_T \lambda}{2}.$$

The virtual antenna array of FIG. 1 then corresponds to a physical antenna array of the size $N_T N_R$ with only $N_T + N_R$ antenna elements. In other words, antenna space is set to half wavelength, except when both transmitter and receiver use multiple antennas along one dimension. In this case, the receiving antenna space is set to the product of $N_T$ with the half wavelength, such that the combination of transmitter and receiver arrays reproduces a virtual uniform linear array of $N_T N_R$ half-wavelength spaced antennas. For example, if a MIMO radar system has 3 transmitting antennas and 4 receiving antennas, 12 signals can be extracted from the receiver because of the orthogonality of the transmitted signals. That is, a 12-element virtual antenna array is created using only 7 antennas by conducting digital signal processing on the received signals, thereby obtaining a finer spatial resolution compared with its phased array counterpart. Creating virtual arrays for a radar with on-chip antennas is therefore too large for a chip of economical size. Moreover, the design of such antenna array is complicated due to the difficulty of modelling the coupling between on-chip antennas.

Disclosed herein are examples of a system that overcomes the above identified shortcomings of existing solutions. More particularly, the present disclosure allows for creating antenna arrays in an economical fashion and without requiring advanced substrates or substrate to chip interconnects or complex packaging.

SUMMARY

According to a first aspect of the present disclosure, a multi-chip system is configured as an antenna array, wherein the multi-chip system comprises: (i) at least two transmitting sets distributed over one or more transmitting chips, wherein a transmitting set comprises an integrated transmitting antenna and an integrated up-conversion circuit; and/or (ii) at least two receiving chips, wherein a receiving chip comprises at least one integrated receiving antenna and at least one integrated down-conversion circuit.

This way, opposite to the trend of integrating more functionality on a single chip, the integrated up-conversion circuit and the integrated down-conversion circuit of the multi-chip system according to the present disclosure are integrated separately and on different chips. In other words, each transmitting chip of the multi-chip system is distinct and physically separate from another transmitting chip and also distinct and physically separate from each receiving chip of the multi-chip system. This way, the different spacing requirements between the transmitting antennas and the receiving antennas that are required in an antenna array can be met in the multi-chip system. Additionally, using multiple chips wherein each of them comprises an integrated antenna allows creating an array of any size.

The chip floorplan and the chip size for the transmitting chips and the receiving chips of the multi-chip system according to the present disclosure are designed in such a way that different transmitting chips and/or receiving chips can be placed such that the distance between the integrated antennas is $\lambda/2$ or a multiple of $\lambda/2$ in case of the receiving chips, or vice versa. A number of transmitting antennas, respectively receiving antennas, being designed in the same dimension as receiving antennas, respectively transmitting antennas, is taken into account when designing the chip floorplan and the chip size. In other words, in the multi-chip system according to the present disclosure, integrated transmitting antennas are placed $\lambda/2$ apart while integrated receiving antennas are spaced by the product of the number of integrated up-conversion circuits in the same dimension as the integrated receiving antennas by $\lambda/2$ apart. Alternatively, in the multi-chip system according to the present disclosure, integrated receiving antennas are placed $\lambda/2$ apart while integrated transmitting antennas are spaced by the product of the number of integrated down-conversion circuits in the same dimension as the integrated transmitting antennas by $\lambda/2$ apart. For example, a dimension of the chip floorplan may be a horizontal dimension in the chip floorplan. Alternatively, a dimension of the chip floorplan may be a vertical dimension in the chip floorplan, wherein the vertical dimension is traverse to the horizontal dimension of the chip floorplan.

Each transmitting chip of the multi-chip system comprises at least one transmitting set. In other words, at least one transmitting antenna and at least one up-conversion circuit are integrated on a transmitting chip of the multi-chip system. In other words, at least one transmitting antenna and at least one up-conversion circuit are arranged on a transmitting chip of the multi-chip system. Each receiving chip of the at least two receiving chips of the multi-chip system according to the present disclosure comprises at least one integrated receiving antenna and at least one integrated down-conversion circuit. In other words, at least one receiving antenna and at least one down-conversion circuit are integrated on a receiving chip of the multi-chip system. In the context of the present disclosure, the term "integrated" is to be understood as designed such that the dimensions of the antennas and the circuits are improved to reduce their respective footprint on the chips. For example, the antennas and the circuits of the multi-chip system according to the present disclosure are miniaturized to reduce their respective footprint on the chips.

In the context of the present disclosure, a transmitting set comprises one integrated transmitting antenna and one integrated up-conversion circuit. At least two transmitting sets are distributed over one or more transmitting chips. In other words, at least two transmitting sets, wherein each of the transmitting sets comprises an integrated transmitting antenna and an integrated up-conversion circuit, are integrated on one or more transmitting chips of the multi-chip system. In the context of the present disclosure, each receiving chip comprises at least one integrated receiving antenna and at least one integrated down-conversion circuit.

In the context of the present disclosure, an integrated up-conversion circuit is a transmitter that converts signals at a lower frequency to signals at a higher frequency for transmission by the antenna. A transmitter is an electronic device which produces radio waves for a transmitting antenna. The transmitter itself generates a radio frequency alternating signal, which is applied to the transmitting antenna. When excited by this alternating signal, the transmitting antenna radiates radio waves. In the context of the present disclosure, an integrated down-conversion circuit is a receiver. A receiver is an electronic device which receives radio waves and converts the information carried by the radio waves to a usable form, i.e. at least to a lower-frequency. It is used with a receiving antenna. The receiving antenna intercepts radio waves and converts the radio waves to alternating signals which are applied to the receiver, and the receiver extracts the desired information. The receiver uses for example electronic filters to separate the desired radio frequency signal from all the other signals picked up by the receiving antenna, an electronic amplifier to increase the power of the signal for further processing and recovers the desired information through for example demodulation. As the integrated up- or down-conversion circuit is integrated onto the respective transmitting or receiving chip, off-chip routing of signals is not complicated as compared with single chip solutions because only lower-frequency signals are used off-chip. Therefore, efficient use of chip area is combined with efficient off-chip routing while achieving large antenna arrays.

A chip is an integrated circuit or monolithic integrated circuit, also referred to as an IC, or a microchip. A chip comprises a set of electronic circuits on one small flat piece of semiconductor material such as, for example, silicon, which can be CMOS compatible. Alternatively, a chip comprises a set of electronic circuits on one small flat piece of semiconductor material such as for example a III-V material such as InP or GaAs, or a chip comprises a set of electronic circuits on one small flat piece of semiconductor material such as Silicon-On-Insulator, or a chip comprises a set of electronic circuits on one small flat piece of semiconductor material such as SiGe. A chip is an integrated circuit which is to be understood as a circuit in which all or some of the circuit elements are inseparably associated and electrically interconnected so that it is considered to be indivisible for the purposes of construction and commerce. Circuits meeting this definition can be constructed using many different technologies, including thin-film transistors, thick-film technologies, or hybrid integrated circuits.

In some examples of the present disclosure, the integrated transmitting antennas of one of the transmitting chips, respectively the integrated receiving antennas of one of the receiving chips, are spaced by $\lambda/2$ from integrated transmitting antennas of another of the transmitting chips, respectively from integrated receiving antennas of another of the receiving chips, wherein $\lambda$ is the wavelength in air.

This way, the different spacing requirements between the transmitting antennas and the receiving antennas that are required in an antenna array can be met in the multi-chip system. Additionally, using multiple chips wherein each of them comprises an integrated antenna allows creating an array of any size.

In some examples of the present disclosure, the integrated receiving antennas of one of the receiving chips, respectively the integrated transmitting antennas of one of the transmitting chips, are spaced by $N_T*(\lambda/2)$ from integrated receiving antennas of another of the receiving chips, wherein $\lambda$ is the wavelength in air and wherein $N_T$ is the number of transmitting antennas in the same dimension as the receiving antennas, respectively are spaced by $N_R*(\lambda/2)$ from integrated transmitting antennas of another of the transmitting chips, wherein $\lambda$ is the wavelength in air and wherein $N_R$ is the number of receiving antennas in the same dimension as the transmitting antennas.

This way, the different spacing requirements between the transmitting antennas and the receiving antennas that are required in an antenna array can be met in the multi-chip system. Additionally, using multiple chips wherein each of them comprises an integrated antenna allows creating an array of any size.

In some examples of the present disclosure, when one of the transmitting chips comprises a plurality of integrated transmitting antennas and a plurality of integrated up-conversion circuits, the integrated transmitting antennas are spaced from each other by $\lambda/2$ on the transmitting chip, wherein $\lambda$ is the wavelength in air.

In some examples of the present disclosure, when one of the receiving chips comprises a plurality of integrated receiving antennas and a plurality of integrated down-conversion circuits, the integrated receiving antennas are spaced from each other by $N_T*(\lambda/2)$ on the receiving chip, wherein $\lambda$ is the wavelength in air and wherein $N_T$ is the number of transmitting antennas in the same dimension as the receiving antennas.

In some examples of the present disclosure, when one of the receiving chips comprises a plurality of integrated receiving antennas and a plurality of integrated down-conversion circuits, the integrated receiving antennas are spaced from each other by $\lambda/2$ on the receiving chip, wherein $\lambda$ is the wavelength in air.

In some examples of the present disclosure, a size of the integrated transmitting antennas and of the integrated receiving antennas is $\lambda_{subs}/2$, wherein $\lambda_{subs}$ is the wavelength in the substrate.

In some examples of the present disclosure, $\lambda_{subs}/2$ is equal to 600 μm. Different design techniques could change the size of the integrated transmitting antennas and of the integrated receiving antennas.

Further reduction of the footprint of the antennas may be achieved by compression of the design of the antennas, e.g. via the use of diamond shape designs and/or via the use of techniques like zigzagging.

In some examples of the present disclosure, the transmitting chips, respectively the receiving chips, further comprise an integrated phase swapping circuit configured to swap the phase of transmitted signals transmitted by the transmitting antennas by 180°, respectively to swap the phase of received signals received by the receiving antennas by 180°.

In the transmitting chips, a phase swapping circuit is integrated to allow swapping the phase of the transmitted signals by 180°. In the receiving chips, a phase swapping circuit is integrated to allow swapping the phase of the received signals by 180°. This allows for more chip placement alternatives while still allowing enough space to be present between the chips of the multi-chip system.

In some examples of the present disclosure, the transmitting chips, respectively the receiving chips, are physically rotated by 180° according to the integrated phase swapping circuit.

This way, the different chips of the multi-chip system can be placed closer together. For example, as a result from the physical rotation of the transmitting chips and/or the receiving chips, wire-bonding wires do not have to go over the antennas and/or between the chips. In case of a 2D array on a single chip for example, the requirement of the $\lambda/2$ distance between the antennas can be complied with thanks to the phase swapping and the physical rotation of the transmitting chips and/or the receiving chips. With the multi-chip system according to the present disclosure, it is therefore possible to create large virtual arrays by gaining more chip area without complicating wire-bonding. Large square or rectangle arrays can be created using two linear arrays for both the receiving chips and the transmitting chips. Since the chip phase inversion is implemented, chips could be rotated by 180° and placed very close to each other. There is no space needed between the chips for wire-bonding, making a chip as wide as possible. The size of the virtual array is therefore unlimited, and the maximum width of the chips is equal to $\lambda/2$ in air with enough space available for wire-bonding.

In some examples of the present disclosure, the antenna array is configured as a multiple-input-multiple-output array.

This way, it is possible to create a virtual mmWave MIMO antenna array using on-chip antennas and without the need for special packaging or mmWave substrate. In other words, it is possible to create a mmWave array without advanced substrate or substrate to chip interconnects.

In some examples of the present disclosure, the antenna array is configured as a beam steering array.

The spacing between all the antennas in a beam steering array is $\lambda/2$.

In some examples of the present disclosure, the multi-chip system further comprises: (i) a substrate; and (ii) a signal generation circuit configured to generate transmit signals at an intermediate frequency for the transmitting chips; wherein the generated transmit signals are routed along the substrate to the transmitting chips for further up-conversion by the integrated up-conversion circuit of the respective transmitting chips; and/or (iii) a signal receiving circuit configured to receive received signals from the integrated down-conversion circuit of the respective receiving chips; wherein the received signals are routed along the substrate to the signal receiving unit.

The transmitting chips and the receiving chips can be integrated on the same substrate. In the context of frequency-modulated continuous-wave radar, also referred to as FMCW, the signal generation circuit is used for the transmitting chips and for the receiving chips. Down-conversion is done in the receiving chip themselves with the generated transmit signals as reference. The transmitting chips may be integrated on the substrate by for example flip-chip or by wire bonding. The receiving chips may be integrated on the substrate by for example flip-chip or by wire bonding. Alternatively, the transmitting chips and the receiving chips are integrated on different substrates.

Chip substrates can have a high dielectric constant, thereby reducing the electrical length of the antennas. Due to the high dielectric constant of the chip substrates, $\lambda/2$ in air for applications such as for example MIMO radar is larger than the $\lambda/2$ on the chip substrates. The design requirements for the antennas give rise to extra spacing between antennas. By placing the antennas on one side of the chips and by placing the circuits and the chip connections, such as for example wire bonding connections or flip-chip connections, on the respective opposite side of the chips, it becomes possible with the multi-chip system according to the present disclosure to, for example, space antennas by $\lambda/2$ with respect to antennas on different chips. The width of a chip can then be smaller than $\lambda/2$ in air minus the distance required between two chips to allow for interconnect. Whether wire-bonding is possible between two different chips of the multi-chip system depends on the footprint required for the integrated up-conversion circuits and the integrated down-conversion circuits. The maximum width of a chip is determined by the minimum required distance to make wire-bonding possible in between two different chips. For example, at 140 GHz, when λ/2 in air is substantially equal to 1 mm and if the wire-bonding requires 500 μm between two chips, the maximum width of the chip is 500 μm as well. Since the antennas are integrated on the chips of the multi-chip system, no special antenna substrate is required. The chips of the multi-chip system can be connected using conventional wire-bond techniques or using flip-chip.

In some examples of the present disclosure, there is provided a radar comprising the multi-chip systems described herein, wherein the signal generation circuit is a chirp generator.

Radio transceivers mostly use a local oscillator signal for frequency up-conversion and down-conversion while radars mostly use a modulated oscillator, such as a chirp generator. The signal generation circuit is for example a low-frequency chirp generator that produces a modulated tone around 16 GHz. In the context of MIMO radar, a central 16 GHz chirp generator may be used. Its output signal is distributed via PCB tracks to the different transmitting chips and to the different receiving chips. On the respective chips, the signal of the chirp generator is multiplied in frequency with for example a factor 9, giving a modulated local oscillator signal around 144 GHz. This way, no mmWave signal needs to be distributed on the PCB and there is no need for a transition between the PCB and one or more chips that carry mmWave signals. This can be beneficial as such transitions between the PCB and the chips give rise to parasitic that cause loss of signal and bandwidth, thereby degrading the performance of the MIMO radar.

In the context of frequency-modulated continuous-wave radar, also referred to as FMCW, the signal generation circuit also generates a reference signal which is routed along the substrate to the receiving chips. Down-conversion is then performed by the receiving chips with the generated reference signal as reference for the down-conversion.

According to a second aspect of the present disclosure, there is provided a method for forming an antenna array from multiple chips, wherein the method comprising the steps of: (i) providing at least two transmitting sets distributed over one or more transmitting chips, wherein a transmitting set comprises an integrated transmitting antenna and an integrated up-conversion circuit; and/or (ii) providing at least two receiving chips, wherein a receiving chip comprises at least one integrated receiving antenna and at least one integrated down-conversion circuit.

This way, opposite to the trend of integrating more functionality on a single chip, the method according to the present disclosure integrates the integrated up-conversion circuit and the integrated down-conversion circuit separately and on different chips. In other words, each transmitting chip is distinct and physically separate from another transmitting chip and also distinct and physically separate from each receiving chip. This way, the different spacing requirements between the transmitting antennas and the receiving antennas that are required in an antenna array can be met. Additionally, using multiple chips wherein each of them comprises an integrated antenna allows creating an array of any size.

With the method according to the present disclosure, the chip floorplan and the chip size for the transmitting chips and the receiving chips are designed in such a way that different transmitting chips and/or receiving chips can be placed such that the distance between the integrated antennas is λ/2 or a multiple of λ/2 in case of the receiving chips, or vice versa. In other words, with the method according to the present disclosure, integrated transmitting antennas are placed λ/2 apart while integrated receiving antennas are spaced by the product of the number of integrated up-conversion circuits by λ/2 apart. Alternatively, with the method according to the present disclosure, integrated receiving antennas are placed λ/2 apart while integrated transmitting antennas are spaced by the product of the number of integrated down-conversion circuits by λ/2 apart.

BRIEF DESCRIPTION OF THE DRAWINGS

FIG. 2A schematically illustrates an example embodiment of a virtual antenna array for MIMO radar operation.

FIG. 2B schematically illustrates an example embodiment of a virtual antenna array for MIMO radar operation.

FIG. 2C schematically illustrates an example embodiment of a virtual antenna array for MIMO radar operation.

FIG. 2D schematically illustrates an example embodiment of a virtual antenna array for MIMO radar operation.

FIG. 2E schematically illustrates an example embodiment of a virtual antenna array for MIMO radar operation.

FIG. 2F schematically illustrates an example embodiment of a virtual antenna array for MIMO radar operation.

DETAILED DESCRIPTION

Figure 1:
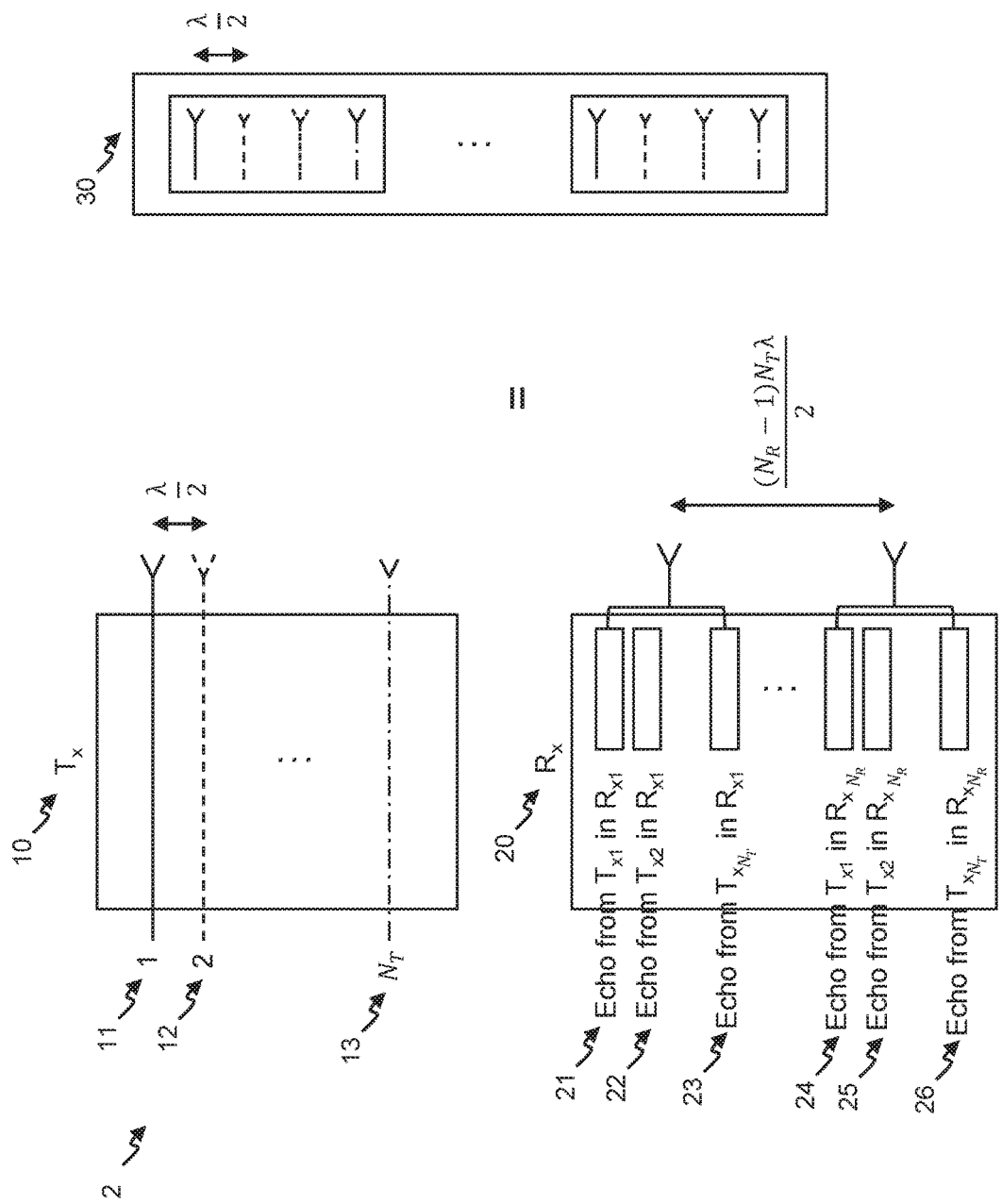
FIG. 1 schematically illustrates an example embodiment of a virtual antenna array for MIMO radar operation.

As shown in FIG. 1, a virtual antenna array 2 for MIMO radar operation comprises $N_T$ transmitting antennas 10, $N_R$ receiving antennas 20, and virtual antennas 30. The transmitting antennas 10 comprise a first transmitting antenna 11, a second transmitting antenna 12, and $N_T$ transmitting antennas 13. The $N_T$ transmitting antennas 10 are spaced from each other by λ/2 wherein λ is the wavelength in free space. The virtual antenna array in FIG. 1 further comprises $N_R$ antennas 20 at the receiver side, wherein the distance between every antenna at the receiver side is $$\frac{N_T \lambda}{2},$$

wherein λ is the wavelength in free space, and wherein the spacing between two outer antennas at the receiver side is $$\frac{(N_R - 1)N_T\lambda}{2}.$$

A first receiving antenna receives echo 21 from the first transmitting antenna 11, and further receives echo 22 from the second transmitting antenna 12, and so forth further receives echo 23 from the $N_T$ transmitting antenna 13. Similarly, an $N_R$ receiving antenna 24 receives echo 24 from the first transmitting antenna 11, and further receives echo 25 from the second transmitting antenna 12, and so forth further receives echo 26 from the $N_T$ transmitting antenna 13. The virtual antenna array of FIG. 1 then corresponds to a physical antenna array of the size $N_T N_R$ 30 with only $N_T+N_R$ antenna elements 30 instead of $N_T N_R+N_T N_R$ antennas.

According to embodiments shown in FIGS. 2A to 2F, virtual antenna arrays 2 comprise a plurality of transmitting antennas 10, a plurality of receiving antennas 20, and a plurality of virtual antennas 30. Components depicted in a similar manner across FIGS. 2A to 2F fulfill the same purpose. The spacing of the receiving antennas 20 depends on the number of transmitting antennas 10 in the same dimension as the receiving antennas 20. The virtual arrays 2 depicted on FIGS. 2A to 2F are created after MIMO processing. The virtual antennas 30 do not physically exist, but they are being created using a MIMO processing algorithm. As visible in FIGS. 2A to 2F, it is possible to create a square virtual antenna array 2 using two linear arrays of transmitting antennas 10 and receiving antennas 20.

Figure 3B:
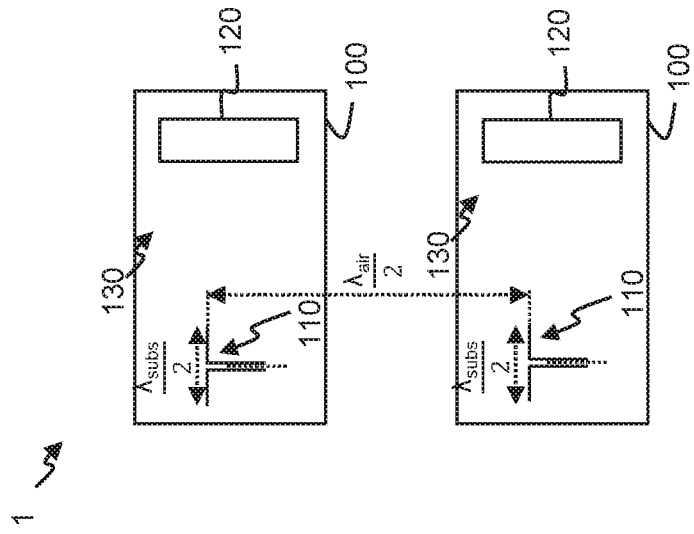
FIG. 3B schematically illustrates an example embodiment of vertical spacing of two transmitting chips.
Figure 3A:
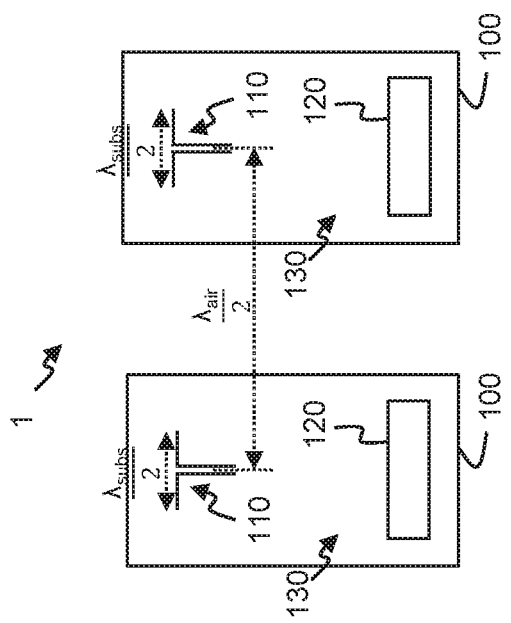
FIG. 3A schematically illustrates an example embodiment of horizontal spacing of two transmitting chips.

According to an embodiment shown in FIG. 3A, a multi-chip system 1 comprises two transmitting sets 130 distributed over two transmitting chips 100. The multi-chip system 1 comprises two transmitting chips 100. Each transmitting chip 100 comprises an integrated transmitting antenna 110 and an integrated up-conversion circuit 120. The two transmitting antennas 110 are spaced from each other by $\lambda_{air}/2$, wherein $\lambda_{air}$ is the wavelength in air. The spacing between the two transmitting chips 100 is horizontal in FIG. 3A. The size of the integrated transmitting antennas 110 is $\lambda_{subs}/2$, wherein $\lambda_{subs}$ is the wavelength in the substrate. According to an embodiment shown in FIG. 3B, a multi-chip system 1 comprises two transmitting sets 110, 120 distributed over two transmitting chips 100. Each transmitting chip 100 comprises an integrated transmitting antenna 110 and an integrated up-conversion circuit 120. The two integrated transmitting antennas 110 are spaced from each other by $\lambda_{air}/2$, wherein $\lambda_{air}$ is the wavelength in air. The spacing between the two transmitting chips 100 is vertical in FIG. 3B. The size of the transmitting antennas 110 is $\lambda_{subs}/2$, wherein $\lambda_{subs}$ is the wavelength in the substrate.

Figure 4:
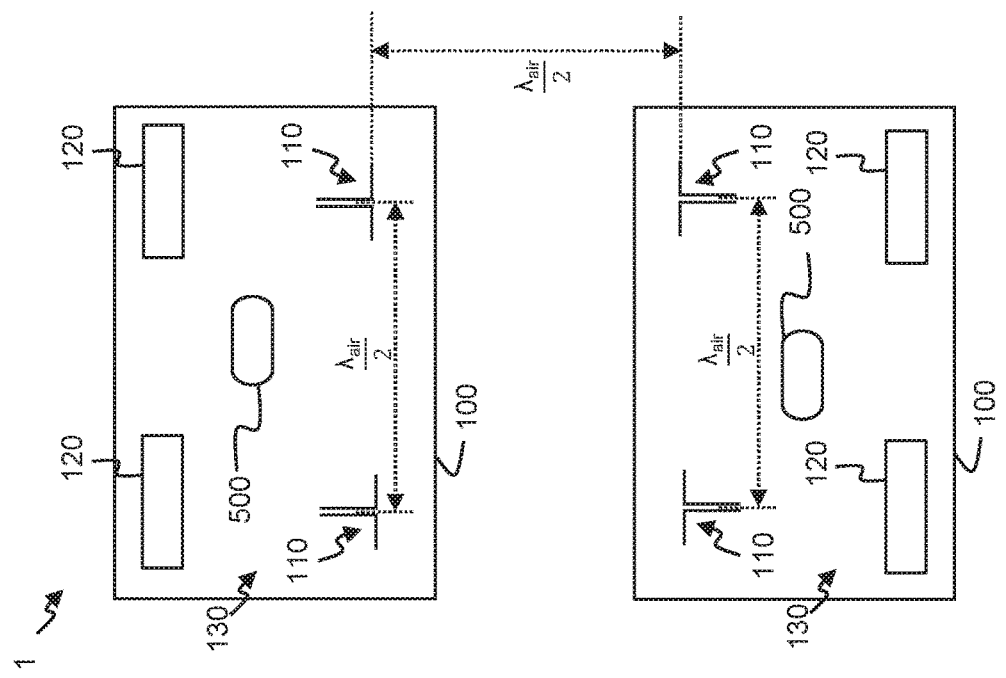
FIG. 4 schematically illustrates an example embodiment of two transmitting chips, wherein each transmitting chip comprises two transmitters merged into a single chip.

According to an embodiment shown in FIG. 4, a multi-chip system 1 comprises four transmitting sets 130 distributed over two transmitting chips 100. The multi-chip system 1 comprises two transmitting chips 100. Each transmitting chip 100 comprises two integrated transmitting antennas 110 and two integrated up-conversion circuits 120. Two transmitting antennas 110 on a single transmitting chip 100 are spaced from each other by $\lambda_{air}/2$, wherein $\lambda_{air}$ is the wavelength in air. The two integrated transmitting antennas 110 of one of the two transmitting chips 100 are respectively spaced from another integrated transmitting antenna 110 of the other transmitting chip 100 of the two transmitting chips 100 by $\lambda_{air}/2$, wherein $\lambda_{air}$ is the wavelength in air. At least one of the two transmitting chips 100 further comprises an integrated phase swapping circuit 500 configured to swap the phase of transmitted signals transmitted by the integrated transmitting antennas 110 by 180°. Consequently, one of the transmitting chips 100 may be physically rotated by 180° according to the integrated phase swapping circuit 500.

Figure 5:
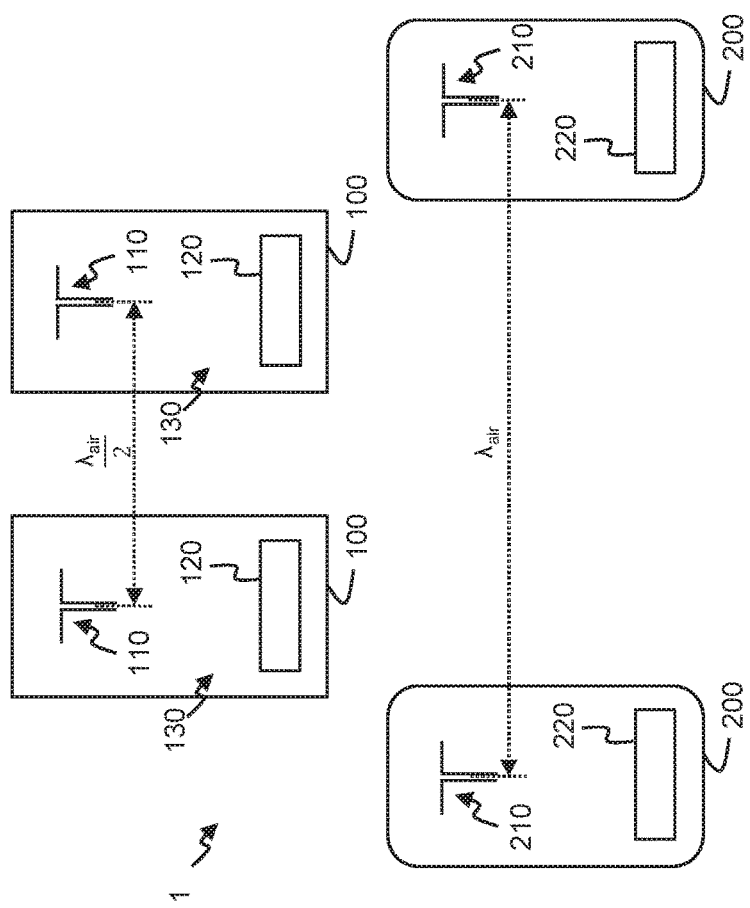
FIG. 5 schematically illustrates an example embodiment of a virtual antenna array.

According to an embodiment shown in FIG. 5, a multi-chip system 1 comprises two transmitting sets 130 integrated on two transmitting chips 100, and two receiving chips 200. The multi-chip system 1 therefore comprises two transmitting chips 100 and two receiving chips 200 wherein each transmitting chip 100 comprises an integrated transmitting antenna 110 and an integrated up-conversion circuit 120, and wherein each receiving chip 200 comprises an integrated receiving antenna 210 and an integrated down-conversion circuit 220. The integrated transmitting antennas 110 are spaced from each other by $\lambda_{air}/2$, wherein $\lambda_{air}$ is the wavelength in air, and the integrated receiving antennas 210 are spaced from each other by $\lambda_{air}$, wherein $\lambda\lambda_{air}$ is the wavelength in air.

Figure 6:
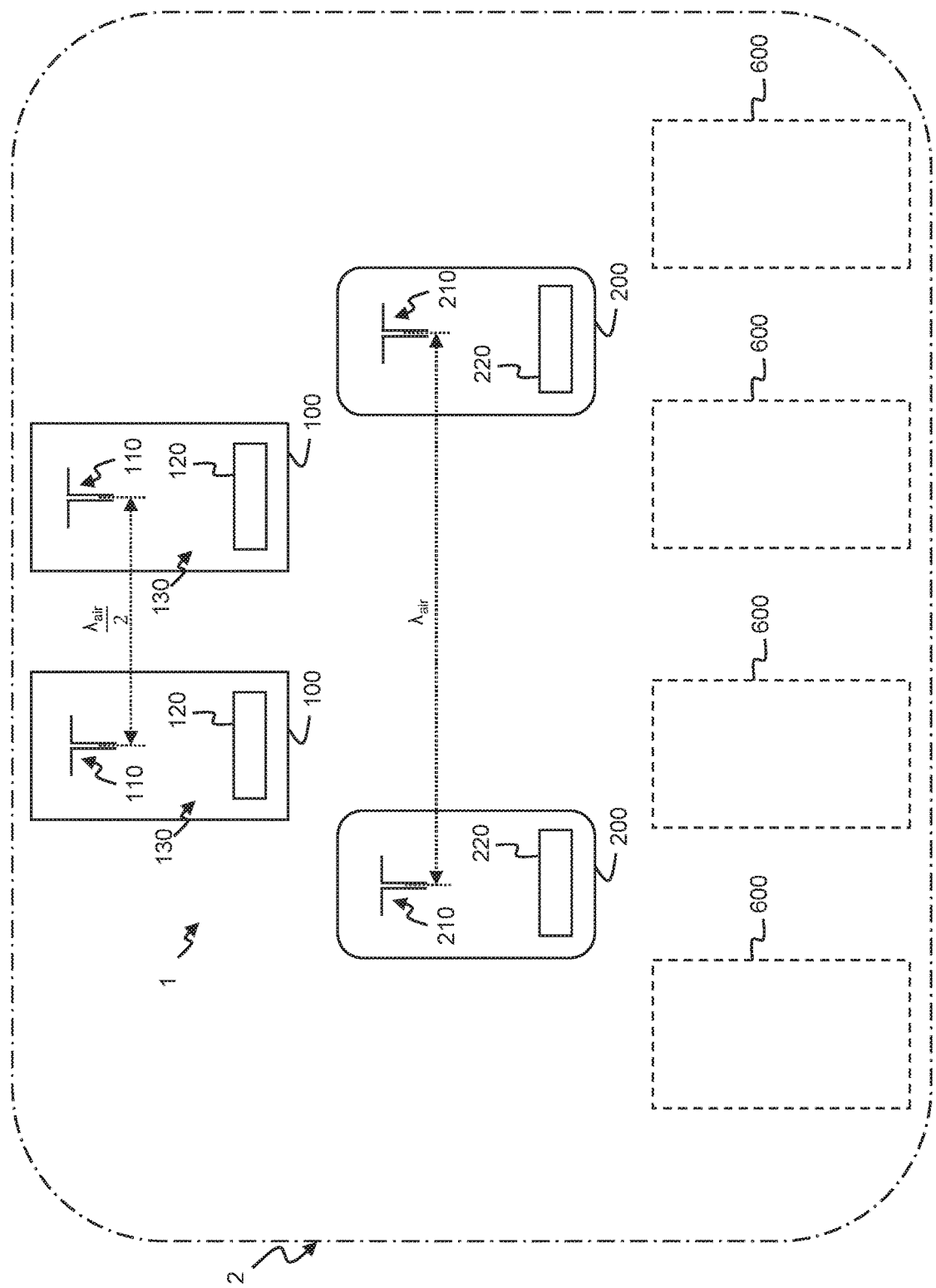
FIG. 6 schematically illustrates an example embodiment of a virtual antenna array.

According to an embodiment shown in FIG. 6, a multi-chip system 1 comprises two transmitting sets 130 integrated on two transmitting chips 100, and two receiving chips 200. The multi-chip system 1 therefore comprises two transmitting chips 100 and two receiving chips 200 wherein each transmitting chip 100 comprises an integrated transmitting antenna 110 and an integrated up-conversion circuit 120, and wherein each receiving chip 200 comprises an integrated receiving antenna 210 and an integrated down-conversion circuit 220. The integrated transmitting antennas 110 are spaced from each other by $\lambda_{air}/2$, wherein $\lambda_{air}$ is the wavelength in air, and the integrated receiving antennas 210 are spaced from each other by $\lambda_{air}$, wherein $\lambda_{air}$ is the wavelength in air, as two transmitting antennas 110 are in the same dimension as the integrated receiving antennas 210. With MIMO radar operation, four virtual antennas 600, are created, thereby configuring the multi-chip system 1 as an antenna array 2 for MIMO radar.

Figure 7:
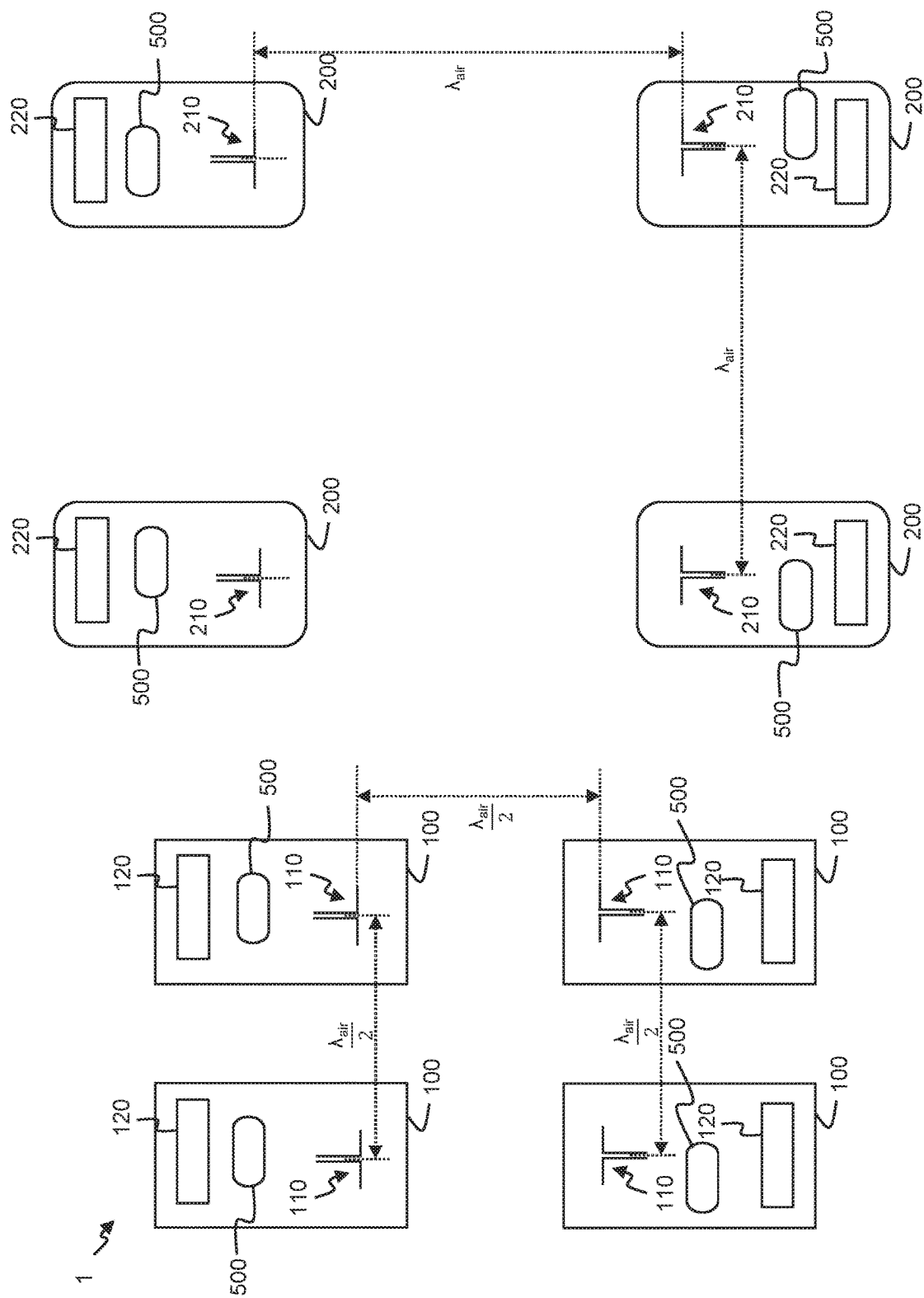
FIG. 7 schematically illustrates an example embodiment of a 4×4 virtual antenna array.

According to an embodiment shown in FIG. 7, a multi-chip system 1 comprises four transmitting sets arranged on four transmitting chips 100. The multi-chip system 1 therefore comprises four transmitting chips 100, wherein each transmitting chip 100 comprises an integrated transmitting antenna 110 and an integrated up-conversion circuit 120. The multi-chip system 1 further comprises four receiving chips 200. Each receiving chip 200 comprises an integrated receiving antenna 210 and an integrated down-conversion circuit 220. Optionally, a transmitting chip 100 further comprises an integrated phase swapping circuit 500 configured to swap the phase of transmitted signals transmitted by the transmitting antennas 110 by 180°. Optionally, a receiving chip 200 further comprises an integrated phase swapping circuit 500 configured to swap the phase of received signals transmitted by the receiving antennas 210 by 180°. Therefore, the transmitting chips 100 and/or the receiving chips 200 may be physically rotated by 180°. The integrated transmitting antennas 110 of two adjacent transmitting chips 100 are spaced from each other by $\lambda_{air}/2$, wherein $\lambda_{air}$ is the wavelength in air. The integrated receiving antennas 210 of two adjacent receiving chips 100 are spaced from each other by $\lambda_{air}$, wherein $\lambda_{air}$ is the wavelength in air as two transmitting antennas 110 are in the same dimension as the integrated receiving antennas 210.

Figure 8:
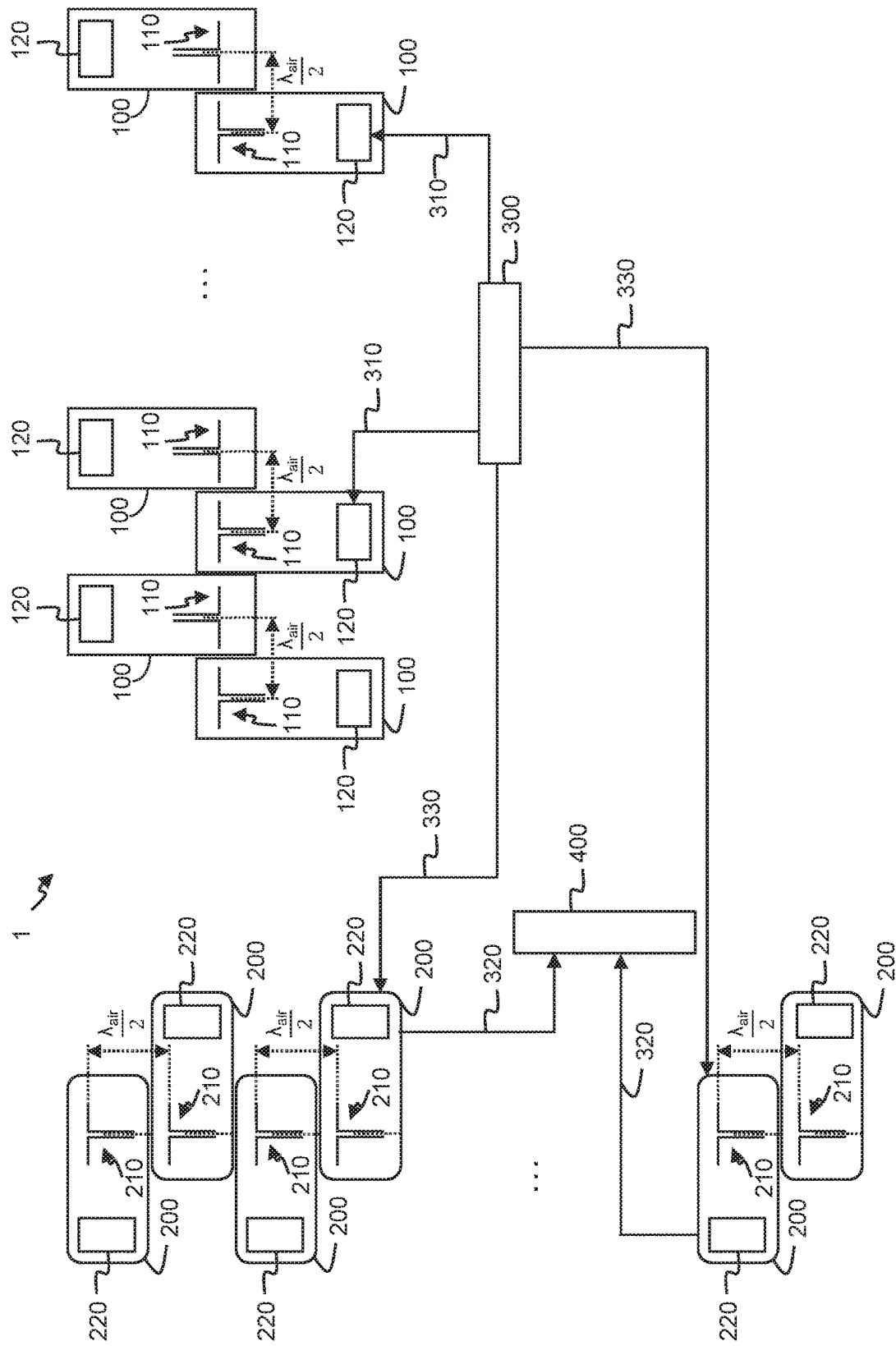
FIG. 8 schematically illustrates an example embodiment of a large virtual antenna array.

According to an embodiment shown in FIG. 8, a multi-chip system 1 comprises a plurality of transmitting sets arranged on a plurality of transmitting chips 100. The multi-chip system 1 therefore comprises a plurality of transmitting chips 100, wherein each transmitting chip 100 comprises an integrated transmitting antenna 110 and an integrated up-conversion circuit 120. The multi-chip system 1 further comprises a plurality of receiving chips 200. Each receiving chip 200 comprises an integrated receiving antenna 210 and an integrated down-conversion circuit 220. Optionally, a transmitting chip 100 further comprises an integrated phase swapping circuit 500 configured to swap the phase of transmitted signals transmitted by the transmitting antennas 110 by 180°. Optionally, a receiving chip 200 further comprises an integrated phase swapping circuit 500 (as shown in FIGS. 4 and 7) configured to swap the phase of received signals transmitted by the receiving antennas 210 by 180°. Therefore, the transmitting chips 100 and/or the receiving chips 200 may be physically rotated by 180°. The integrated phase swapping circuit 500 are not represented on FIG. 8 for clarity reasons. The integrated transmitting antennas 110 of two adjacent transmitting chips 100 are spaced from each other by $\lambda_{air}/2$, wherein $\lambda_{air}$ is the wavelength in air. The integrated receiving antennas 210 of two adjacent receiving chips 100 are spaced from each other by $\lambda_{air}$, wherein $\lambda_{air}$ is the wavelength in air as two transmitting antennas 110 are in the same dimension as the integrated receiving antennas 210. The multi-chip system 1 further comprises a signal generation circuit 300 which generates transmit signals 310 at an intermediate frequency for the transmitting chips 100, wherein the generated transmit signals 310 are routed along a substrate to the transmitting chips 100 for further up-conversion by the integrated up-conversion circuit 120 of the respective transmitting chips 100. The multi-chip system 1 further comprises signal receiving circuit 400 which receives received signals 320 from the integrated down-conversion circuits 220 of the respective receiving chips 200, wherein the received signals 320 are routed along the substrate to the signal receiving circuit 400. The signal generation circuit 300 further generates a reference signal 330. The generated reference signal 330 is routed along the substrate to the receiving chips 200. Down-conversion of the received signals is performed by the receiving chips 200 with the generated reference signal 330 as reference. According to an alternative embodiment, the transmitting chips and the receiving chips are integrated on different substrates.

Figure 9:
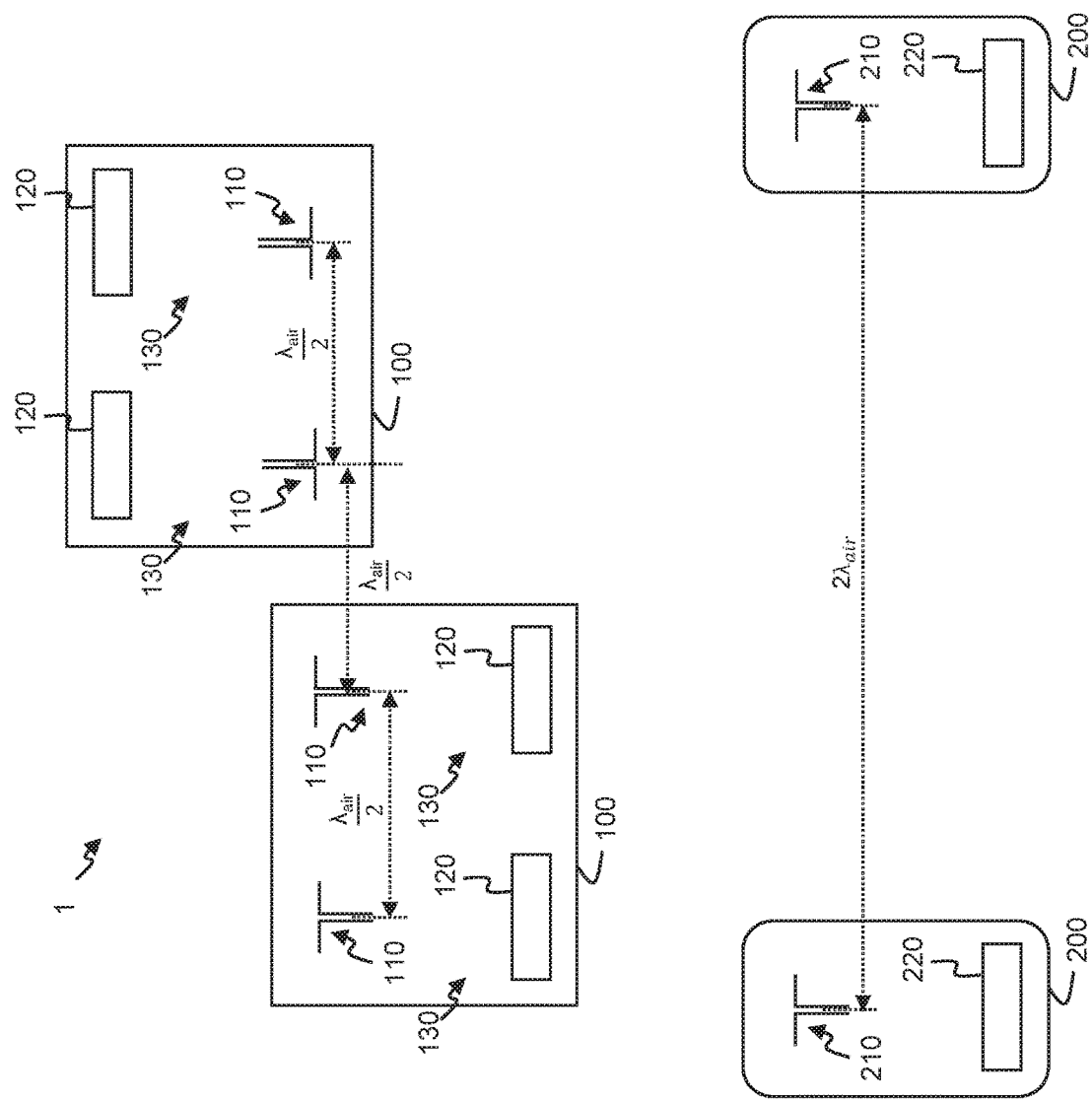
FIG. 9 schematically illustrates an example embodiment of a virtual antenna array.

According to an embodiment shown in FIG. 9, a multi-chip system 1 comprises four transmitting sets 130 arranged on two transmitting chips 100. The multi-chip system 1 therefore comprises two transmitting chips 100, wherein each transmitting chip 100 comprises two integrated transmitting antennas 110 and two integrated up-conversion circuits 120. The multi-chip system 1 further comprises two receiving chips 200. Each receiving chip 200 comprises an integrated receiving antenna 210 and an integrated down-conversion circuit 220. Optionally, a transmitting chip 100 further comprises an integrated phase swapping circuit 500 (as shown in FIGS. 4 and 7) configured to swap the phase of transmitted signals transmitted by the transmitting antennas 110 by 180°. Optionally, a receiving chip 200 further comprises an integrated phase swapping circuit 500 (as shown in FIGS. 4 and 7) configured to swap the phase of received signals transmitted by the receiving antennas 210 by 180°. Therefore, the transmitting chips 100 and/or the receiving chips 200 may be physically rotated by 180°. The integrated phase swapping circuits 500 are not represented in FIG. 9 for clarity reasons. On a single transmitting chip 100, the integrated transmitting antennas 110 of the transmitting chip 100 are spaced from each other by $\lambda_{air}/2$, wherein $\lambda_{air}$ is the wavelength in air. The integrated transmitting antennas 110 of two adjacent transmitting chips 100 are spaced from each other by $\lambda_{air}/2$, wherein $\lambda_{air}$ is the wavelength in air. The integrated receiving antennas 210 of two adjacent receiving chips 100 are spaced from each other by $2\lambda_{air}$, wherein $\lambda_{air}$ is the wavelength in air as four transmitting antennas 110 are in the same dimension as the integrated receiving antennas 210.

Figure 10:
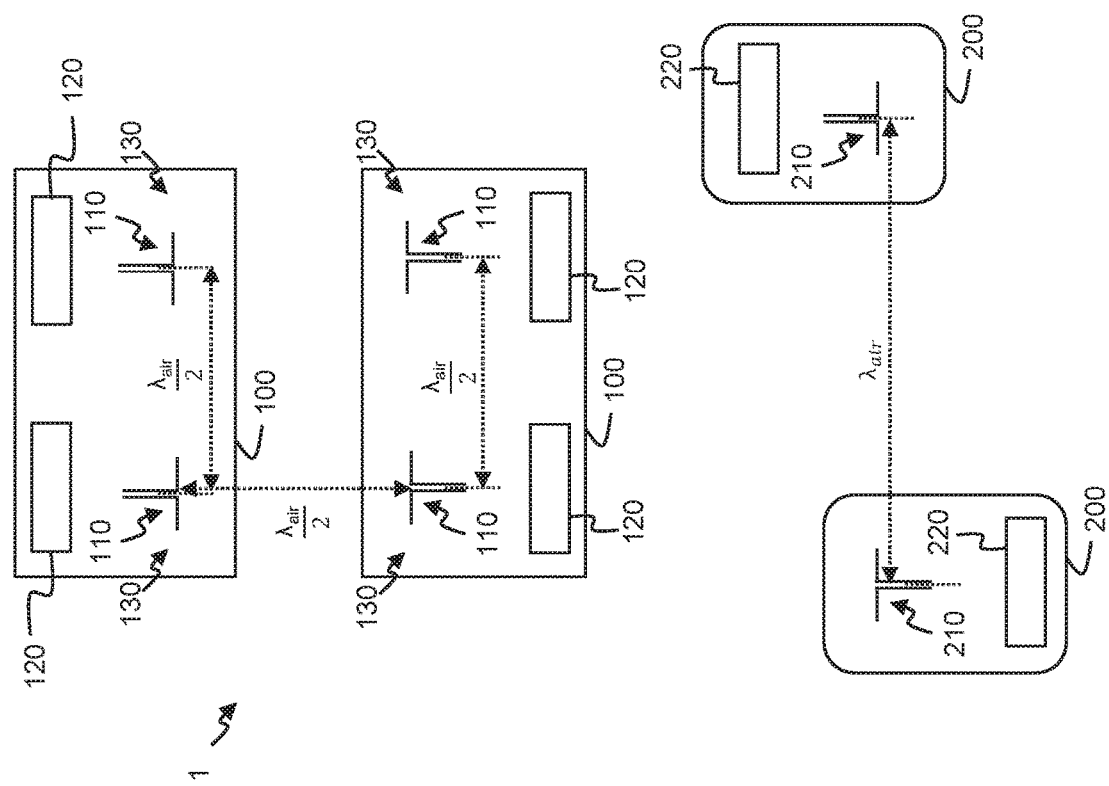
FIG. 10 schematically illustrates an example embodiment of a virtual antenna array.

According to an embodiment shown in FIG. 10, a multi-chip system 1 comprises four transmitting sets 130 arranged on two transmitting chips 100. The multi-chip system 1 therefore comprises two transmitting chips 100, wherein each transmitting chip 100 comprises two integrated transmitting antennas 110 and two integrated up-conversion circuits 120. The multi-chip system 1 further comprises two receiving chips 200. Each receiving chip 200 comprises an integrated receiving antenna 210 and an integrated down-conversion circuit 220. Optionally, a transmitting chip 100 further comprises an integrated phase swapping circuit 500 (as shown in FIGS. 4 and 7) configured to swap the phase of transmitted signals transmitted by the transmitting antennas 110 by 180°. Optionally, a receiving chip 200 further comprises an integrated phase swapping circuit 500 (as shown in FIGS. 4 and 7) configured to swap the phase of received signals transmitted by the receiving antennas 210 by 180°. Therefore, the transmitting chips 100 and/or the receiving chips 200 may be physically rotated by 180°. The integrated phase swapping circuits 500 are not represented in FIG. 10 for clarity reasons. On a single transmitting chip 100, the integrated transmitting antennas 110 of the transmitting chip 100 are spaced from each other by $\lambda_{air}/2$, wherein $\lambda_{air}$ is the wavelength in air. The integrated transmitting antennas 110 of two adjacent transmitting chips 100 are spaced from each other by $\lambda_{air}/2$, wherein $\lambda_{air}$ is the wavelength in air. The integrated receiving antennas 210 of two adjacent receiving chips 100 are spaced from each other by $\lambda_{air}$, wherein $\lambda_{air}$ is the wavelength in air as two transmitting antennas 110 are in the same dimension as the integrated receiving antennas 210.

Figure 11:
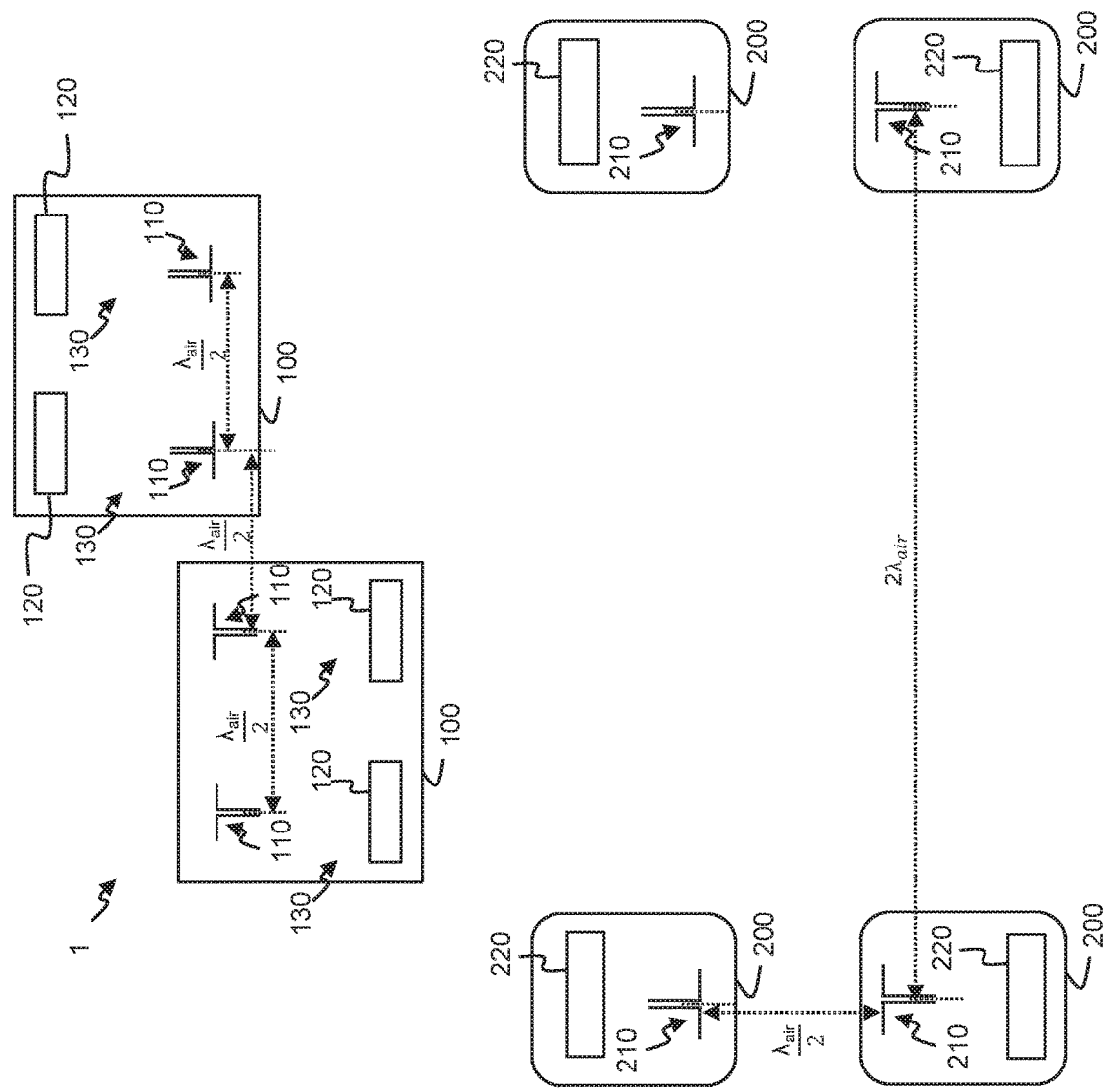
FIG. 11 schematically illustrates an example embodiment of a virtual antenna array.

According to an embodiment shown in FIG. 11, a multi-chip system 1 comprises four transmitting sets 130 arranged on two transmitting chips 100. The multi-chip system 1 therefore comprises two transmitting chips 100, wherein each transmitting chip 100 comprises two integrated transmitting antennas 110 and two integrated up-conversion circuits 120. The multi-chip system 1 further comprises four receiving chips 200. Each receiving chip 200 comprises an integrated receiving antenna 210 and an integrated down-conversion circuit 220. Optionally, a transmitting chip 100 further comprises an integrated phase swapping circuit 500 (as shown in FIGS. 4 and 7) configured to swap the phase of transmitted signals transmitted by the transmitting antennas 110 by 180°. Optionally, a receiving chip 200 further comprises an integrated phase swapping circuit 500 (as shown in FIGS. 4 and 7) configured to swap the phase of received signals transmitted by the receiving antennas 210 by 180°. Therefore, the transmitting chips 100 and/or the receiving chips 200 may be physically rotated by 180°. The integrated phase swapping circuits 500 are not represented in FIG. 11 for clarity reasons. On a single transmitting chip 100, the integrated transmitting antennas 110 of the transmitting chip 100 are spaced from each other by $\lambda_{air}/2$, wherein $\lambda_{air}$ is the wavelength in air. The integrated transmitting antennas 110 of two adjacent transmitting chips 100 are spaced from each other by $\lambda_{air}/2$, wherein $\lambda_{air}$ is the wavelength in air. The integrated receiving antennas 210 of two adjacent receiving chips 100 are spaced from each other by $2\lambda_{air}$ in the horizontal direction, wherein $\lambda_{air}$ is the wavelength in air as four transmitting antennas 110 are in the same dimension as the integrated receiving antennas 210.

Figure 12:
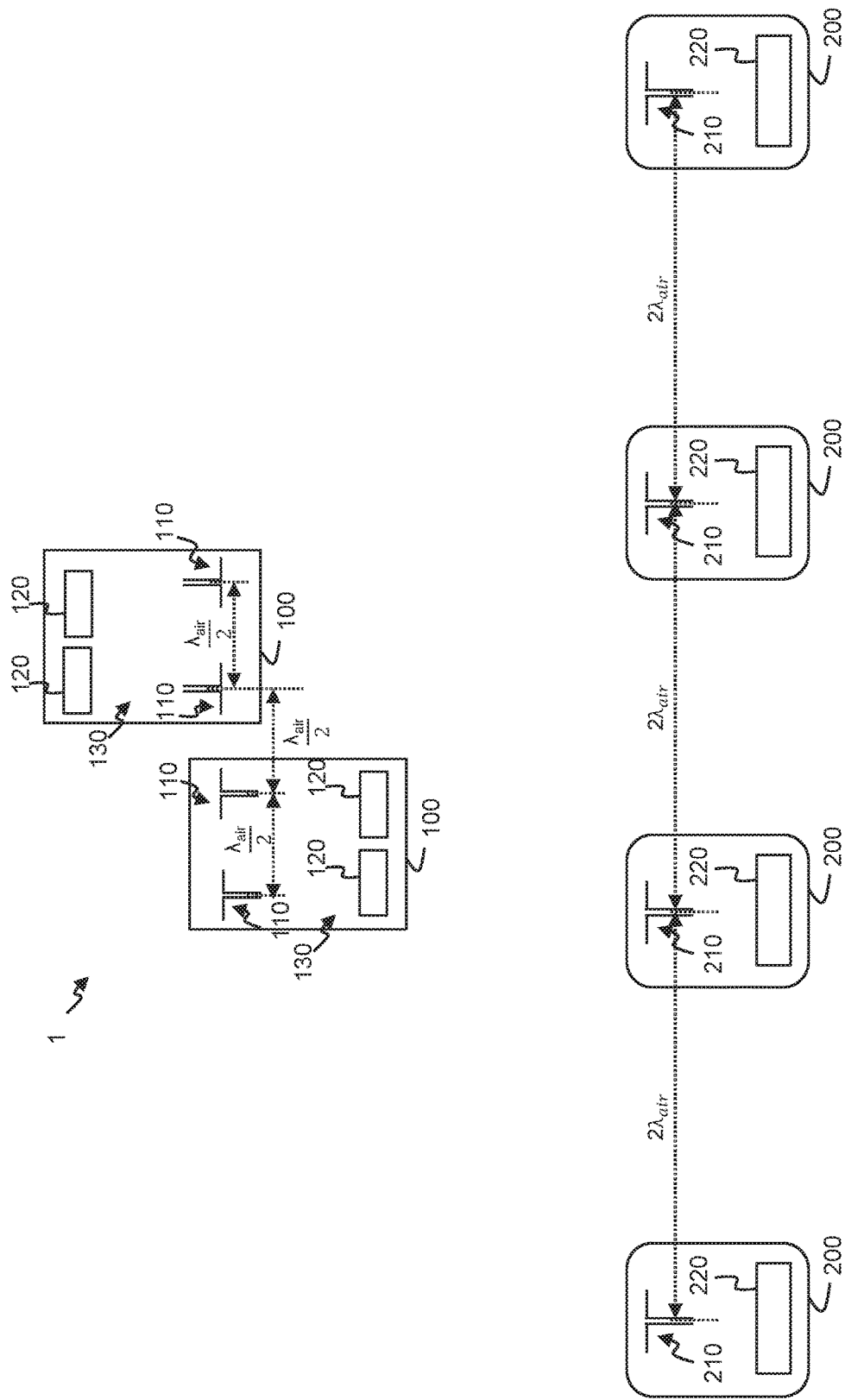
FIG. 12 schematically illustrates an example embodiment of a virtual antenna array.

According to an embodiment shown in FIG. 12, a multi-chip system 1 comprises four transmitting sets 130 arranged on two transmitting chips 100. The multi-chip system 1 therefore comprises two transmitting chips 100, wherein each transmitting chip 100 comprises two integrated transmitting antennas 110 and two integrated up-conversion circuits 120. The multi-chip system 1 further comprises four receiving chips 200. Each receiving chip 200 comprises an integrated receiving antenna 210 and an integrated down-conversion circuit 220. Optionally, a transmitting chip 100 further comprises an integrated phase swapping circuit 500 (as shown in FIGS. 4 and 7) configured to swap the phase of transmitted signals transmitted by the transmitting antennas 110 by 180°. Optionally, a receiving chip 200 further comprises an integrated phase swapping circuit 500 (as shown in FIGS. 4 and 7) configured to swap the phase of received signals transmitted by the receiving antennas 210 by 180°. Therefore, the transmitting chips 100 and/or the receiving chips 200 may be physically rotated by 180°. The integrated phase swapping circuits 500 are not represented in FIG. 11 for clarity reasons. On a single transmitting chip 100, the integrated transmitting antennas 110 of the transmitting chip 100 are spaced from each other by $\lambda_{air}/2$, wherein $\lambda_{air}$ is the wavelength in air. The integrated transmitting antennas 110 of two adjacent transmitting chips 100 are spaced from each other by $\lambda_{air}/2$, wherein $\lambda_{air}$ is the wavelength in air. The integrated receiving antennas 210 of two adjacent receiving chips 100 are spaced from each other by $2\lambda_{air}$ in the horizontal direction, wherein $\lambda_{air}$ is the wavelength in air as four transmitting antennas 110 are in the same dimension as the integrated receiving antennas 210. In the other dimension, the vertical dimension, the integrated receiving antennas 210 of two adjacent receiving chips 100 are spaced from each other by $\lambda_{air}/2$, wherein $\lambda_{air}$ is the wavelength in air.

As used in this application, the term "circuit" may refer to one or more or all of the following: (a) hardware-only circuit implementations such as implementations in only analog and/or digital circuitry; (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions); or (c) hardware circuit(s) and/or processor(s), such as microprocessor(s) or a portion of a microprocessor(s), that requires software (e.g. firmware) for operation, but the software may not be present when it is not needed for operation. This definition of circuit applies to all uses of this term in this disclosure, including in any claims. As a further example, as used in this disclosure, the term circuit also covers an implementation of merely a hardware circuit or processor (or multiple processors) or portion of a hardware circuit or processor and its (or their) accompanying software and/or firmware. The term circuit also covers, for example and if applicable to the particular claim element, a baseband integrated circuit or processor integrated circuit for a mobile device or a similar integrated circuit in a server, a cellular network device, or other computing or network device.

Although the present disclosure has been described by reference to specific embodiments, it will be apparent that the disclosure is not limited to the details of the foregoing illustrative embodiments, and that the present disclosure may be embodied with various changes and modifications without departing from the scope thereof. The present embodiments are therefore to be considered in all respects as illustrative and not restrictive, the scope of the present disclosure being indicated by the appended claims rather than by the foregoing description, and all changes that fall within the scope of the claims are therefore intended to be embraced therein.

It will furthermore be understood by the reader of this disclosure that the words "comprising" or "comprise" do not exclude other elements or steps, that the words "a" or "an" do not exclude a plurality, and that a single element, such as a computer system, a processor, or another integrated unit may fulfill the functions of several means recited in the claims. Any reference signs in the claims shall not be construed as limiting the respective claims concerned. The terms "first," "second," "third," "a," "b," "c," and the like, when used in the description or in the claims are introduced to distinguish between similar elements or steps and are not necessarily describing a sequential or chronological order. Similarly, the terms "top," "bottom," "over," "under," and the like are introduced for descriptive purposes and not necessarily to denote relative positions. It is to be understood that the terms so used are interchangeable under appropriate circumstances and embodiments of the present disclosure are capable of operating in other sequences, or in orientations different from the one(s) described or illustrated above.

What is claimed is:

1. A multi-chip system configured as an antenna array, wherein the multi-chip system comprises:
    at least two transmitting sets distributed over two or more transmitting chips, wherein each transmitting chip of the two or more transmitting chips is a monolithic integrated circuit, wherein an individual transmitting set of the at least two transmitting sets comprises: an integrated transmitting antenna; and an integrated up-conversion circuit, wherein the integrated transmitting antenna and the integrated up-conversion circuit are integrated into the same monolithic integrated circuit of the same transmitting chip of the two or more transmitting chips; and
    at least two receiving chips, wherein each receiving chip of the at least two receiving chips is a monolithic integrated circuit, wherein an individual receiving chip of the at least two receiving chips comprises: at least one integrated receiving antenna; and at least one integrated down-conversion circuit, wherein the at least one integrated receiving antenna and the at least one integrated down-conversion circuit are integrated into the same monolithic integrated circuit of the same receiving chip of the at least two receiving chips.

2. The multi-chip system according to claim 1, wherein one of the integrated transmitting antennas of one of the two or more transmitting chips is spaced by $\lambda/2$ from one of the integrated transmitting antennas of another one of the two or more transmitting chips, wherein one of the integrated receiving antennas of one of the at least two receiving chips is spaced by $\lambda/2$ from one of the integrated receiving antennas of another one of the at least two receiving chips, and wherein $\lambda$ is the wavelength in air.

3. The multi-chip system according to claim 2, wherein the two or more transmitting chips comprise $N_T$ of the integrated transmitting antennas arranged in a particular dimension, wherein the at least two receiving chips comprise $N_R$ of the integrated receiving antennas arranged in the particular dimension, wherein one of the integrated transmitting antennas of one of the two or more transmitting chips is spaced by $N_R*(\lambda/2)$ from another one of the integrated transmitting antennas of another one of the two or more transmitting chips, and wherein one of the integrated receiving antennas of one of the at least two receiving chips is spaced by $N_T*(\lambda/2)$ from another one of the integrated receiving antennas of another one of the at least two receiving chips.

4. The multi-chip system according to claim 1, wherein a first transmitting chip of the two or more transmitting chips comprises a plurality of the integrated transmitting antennas and a plurality of the integrated up-conversion circuits, wherein the plurality of the integrated transmitting antennas are spaced from each other by $\lambda/2$ on the first transmitting chip, and wherein $\lambda$ is the wavelength in air.

5. The multi-chip system according to claim 4, wherein a first receiving chip of the at least two receiving chips comprises a plurality of the integrated receiving antennas and a plurality of the integrated down-conversion circuits, wherein the plurality of the integrated receiving antennas are spaced from each other by $N_T*(\lambda/2)$ in a particular dimension on the receiving chip, and wherein $N_T$ is the number of the integrated transmitting antennas arranged in the particular dimension.

6. The multi-chip system according to claim 4, wherein a first receiving chip of the at least two receiving chips comprises a plurality of the integrated receiving antennas and a plurality of the integrated down-conversion circuits, and wherein the plurality of the integrated receiving antennas are spaced from each other by $\lambda/2$ on the first receiving chip.

7. The multi-chip system according to claim 1, wherein a size of the integrated transmitting antennas and of the integrated receiving antennas is $\lambda_{subs}/2$, wherein $\lambda_{subs}$ is the wavelength in the substrate.

8. The multi-chip system according to claim 1, wherein the two or more transmitting chips each further comprise an integrated phase swapping circuit configured to swap the phase of transmitted signals transmitted by the integrated transmitting antennas by 180°, and wherein the at least two receiving chips each further comprise an integrated phase swapping circuit configured to swap the phase of received signals received by the integrated receiving antennas by 180°.

9. The multi-chip system according to claim 8, wherein one of the two or more transmitting chips is physically rotated by 180° relative to another one of the two or more transmitting chips, and wherein one of the at least two receiving chips is physically rotated by 180° relative to another one of the at least two receiving chips.

10. The multi-chip system according to claim 1, wherein the antenna array is configured as a multiple-input-multiple-output array.

11. The multi-chip system according to claim 1, wherein the antenna array is configured as a beam steering array.

12. The multi-chip system according to claim 1, further comprising:
a substrate;
a signal generation circuit configured to generate transmit signals at an intermediate frequency for the two or more transmitting chips, wherein the generated transmit signals are routed along the substrate to the two or more transmitting chips for up-conversion by the integrated up-conversion circuits of the two or more transmitting chips; and
a signal receiving circuit configured to receive received signals from the integrated down-conversion circuits of the at least two receiving chips, wherein the received signals are routed along the substrate to the signal receiving circuit.

13. The multi-chip system according to claim 12, wherein the signal generation circuit is a chirp generator.

14. A method for forming an antenna array from multiple chips, the method comprising:
providing at least two transmitting sets distributed over two or more transmitting chips, wherein each transmitting chip of the two or more transmitting chips is a monolithic integrated circuit, wherein an individual transmitting set of the at least two transmitting sets comprises: an integrated transmitting antenna; and an integrated up-conversion circuit, wherein the integrated transmitting antenna and the integrated up-conversion circuit are integrated into the same monolithic integrated circuit of the same transmitting chip of the two or more transmitting chips; and
providing at least two receiving chips, wherein each receiving chip of the at least two receiving chips is a monolithic integrated circuit, wherein an individual receiving chip of the at least two receiving chips comprises: at least one integrated receiving antenna; and at least one integrated down-conversion circuit, wherein the at least on integrated receiving antenna and the at least one integrated down-conversion circuit are integrated into the same monolithic integrated circuit of the same receiving chip of the at least two receiving chips.

15. The method according to claim 14, wherein providing the at least two transmitting sets comprises spacing one of the integrated transmitting antennas of one of the two or more transmitting chips by $\lambda/2$ from one of the integrated transmitting antennas of another one of the two or more transmitting chips, wherein providing the at least two receiving chips comprises spacing one of the integrated receiving antennas of one of the at least two receiving chips by $\lambda/2$ from one of the integrated receiving antennas of another one of the at least two receiving chips, and wherein $\lambda$ is the wavelength in air.

16. The method according to claim 14, wherein the two or more transmitting chips comprise $N_T$ of the integrated transmitting antennas, wherein the at least two receiving chips comprise $N_R$ of the integrated receiving antennas, wherein providing the at least two transmitting sets comprises spacing, in a particular dimension, one of the integrated transmitting antennas of one of the two or more transmitting chips by $N_R*(\lambda/2)$ from another one of the integrated transmitting antennas of another one of the two or more transmitting chips, wherein providing the at least two receiving chips comprises spacing, in the particular dimension, one of the integrated receiving antennas of one of the at least two receiving chips by $N_T*(\lambda/2)$ from another one of the integrated receiving antennas of another one of the at least two receiving chips, and wherein $\lambda$ is the wavelength in air.

17. The method according to claim 14, wherein each transmitting set of the at least two transmitting sets further comprises an integrated phase swapping circuit configured to swap the phase of transmitted signals transmitted by the integrated transmitting antennas by 180°, and wherein the at least two receiving chips each further comprise an integrated phase swapping circuit configured to swap the phase of received signals received by the integrated receiving antennas by 180°.

18. The method according to claim 17, wherein providing the at least two transmitting sets comprises physically rotating one of the two or more transmitting chips by 180° relative to another one of the at least two or more transmitting chips, and wherein providing the at least two receiving chips comprises physically rotating one of the at least two receiving chips by 180° relative to another one of the at least two receiving chips.

19. The method according to claim 14, further comprising configuring the antenna array as a multiple-input-multiple-output array or a beam steering array.

20. The method according to claim 14, further comprising:
- providing a substrate;
- providing a signal generation circuit configured to generate transmit signals at an intermediate frequency for the at least two transmitting sets;
- routing the generated transmit signals along the substrate to the at least two transmitting sets for up-conversion by the integrated up-conversion circuits of the at least two transmitting sets;
- providing a signal receiving circuit configured to receive received signals from the integrated down-conversion circuits of the at least two receiving chips; and
- routing the received signals along the substrate to the signal receiving circuit.

\* \* \* \* \*